United States Patent
O'Lenick, Jr. et al.

(10) Patent No.: US 6,410,679 B1
(45) Date of Patent: Jun. 25, 2002

(54) CATIONIC COMPLEXES OF POLYOXYALKYLENE GLYCOL DICARBOXYLATES

(75) Inventors: Anthony J. O'Lenick, Jr., Dacula, GA (US); Charles W. Buffa, Paterson, NJ (US)

(73) Assignee: Biosil Research Institute, Paterson, NJ (US)

( * ) Notice: Subject to any disclaimer, the term of this patent is extended or adjusted under 35 U.S.C. 154(b) by 40 days.

(21) Appl. No.: 09/611,979

(22) Filed: Jul. 7, 2000

Related U.S. Application Data

(63) Continuation-in-part of application No. 09/425,896, filed on Oct. 25, 1999, now abandoned.

(51) Int. Cl.[7] .................. C08G 63/127; C08G 63/13
(52) U.S. Cl. .................. 528/288; 528/308; 528/486; 528/492
(58) Field of Search ................. 528/288, 308, 528/486, 492

(56) References Cited

U.S. PATENT DOCUMENTS

| | | | |
|---|---|---|---|
| 3,856,830 A | * | 12/1974 | Kuehn et al. |
| 5,162,472 A | | 11/1992 | O'Lenick, Jr. |
| 5,873,908 A | * | 2/1999 | Dahmen et al. |

FOREIGN PATENT DOCUMENTS

| | | | |
|---|---|---|---|
| JP | 59021780 | * | 2/1984 |
| JP | 07185289 | * | 7/1995 |
| JP | WO-9711130 | * | 3/1997 |
| JP | 09286851 | * | 11/1997 |
| JP | 10067549 | * | 3/1998 |
| JP | 102591887 | * | 9/1998 |

OTHER PUBLICATIONS

Oliver et al, Nanoparticles Built of Cross–linked Heterotelechelic,,,Macromolecules, 2000, 33, 4780–4790.*

* cited by examiner

*Primary Examiner*—Duc Truong

(57) ABSTRACT

The present invention deals with the composition, and application of polyoxyalkylene glycol dicarboxylates, and complexes thereof. The complexes are made by a series of reactions which include reaction of an anhydride with a polyoxyalkylene glycol, then formation of a complex of the poly carboxylate with quaternary compounds. The complexes are useful as softening, anti-tangle, and conditioning agents for use in personal care applications due to their outstanding mildness.

4 Claims, No Drawings

CATIONIC COMPLEXES OF POLYOXYALKYLENE GLYCOL DICARBOXYLATES

RELATED APPLICATION

This application is a continuation in part of copending U.S. patent Ser. No. 09/425,896 filed Oct. 25, 1999, now abandoned.

BACKGROUND OF THE INVENTION

1. Field of the Invention

The present invention deals with the composition, and application of novel carboxylated polymers, and complexes thereof. The complexes useful as softening, anti-tangle, and conditioning agents for use in personal care applications due to their outstanding mildness. The properties of these novel compounds that makes them well suited for these applications is the fact that they are substantive to fibers, hair and skin and also very mild to the skin and eyes and provide protection from environmental factors like acid rain and other pollutions which come in contact with hair and skin. The use of the complex results in several additional desirable properties heretofore unattainable. This includes overcoming the problem of eye and skin irritation using traditional cationic conditioning agents.

2. Arts and Practices

The prior practices for providing softening, anti-tangle, and conditioning properties for use in personal care, textile and related applications has been incorporation of quaternary compounds. These materials have been used for many years despite some significant drawbacks including irritation, negative impact on the aquatic environment, build up and yellowing of the substrate upon which they are applied.

U.S. Pat. No. 5,162,472 to O'Lenick discloses free radical polymers which incorporate silicone into the backbone. While these materials have desirable properties, they do not form monolayers on the hair nor do they provide the protection to the hair offered by the present invention.

The references cited herein are incorporated by reference to the extent applicable. Ratios and percentages are by weight and temperatures are Celsius unless otherwise stated.

THE INVENTION

OBJECT OF THE INVENTION

It is the object of the current invention to provide a novel series of anionic cationic complexes using traditional cationic compounds and polyoxyalkylene dicarboxylates. The formation of a high molecular weight complexes results in less penetration of the skin by the compounds of the present invention and a very effective conditioner that remains on the surface of the hair or skin where the conditioning agent is most effective.

It is another object of the current invention to provide a novel polyoxyalkylene dicarboxylate used as an intermediate in the preparation of the compounds of the present invention.

It is still another objective of the current invention to provide personal care compositions which contain an effective conditioning amount of the compounds of the current invention. That effective conditioning concentration will vary from 0.1 to 20% of the composition. The compounds of the present invention have outstanding conditioning properties when applied to hair and skin.

SUMMARY OF THE INVENTION

The present invention is directed to complexes made by the formation of salts using a cationic surfactant and a dicarboxylic polyoxyalkylene compound. These complexes have outstanding conditioning on hair, exceptional feel on skin and are well tolerated by skin and eyes. The compounds can be formulated with dimethicone copolyols to provide a multipurpose cosmetic conditioner.

The polyoxyalkylene dicarboxy is complexed with a variety of quaternary compounds to form the conditioning quats of the present invention.

The polyoxyalkylene dicarboxylate used to make the compounds of the present invention conform to the following structure:

wherein:

a, b and c are integers each independently ranging from 0 to 20;

$R^1$ is selected from the group consisting of
—C(O)—$CH_2$—$CH_2$—C(O)—OH;
—C(O)—CH=CH—C(O)—OH; and

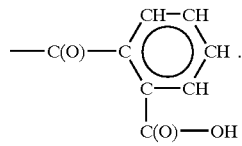

The compounds are made by the reaction of polyoxyalkylene glycols (PEGS and PPGS), which are commercially available with succinic anhydride, maleic anhydride and phthalic anhydride.

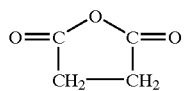

succinic anhydride

wherein $R^1$ is —C(O)—$CH_2$—$CH_2$—C(O)—OH.

The same reaction is conducted with maleic anhydride and phthalic anhydride to give the other compounds.

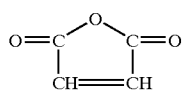

maleic anhydride

wherein $R^1$ is —C(O)—$CH_2$=$CH_2$—C(O)—OH.

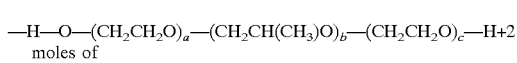

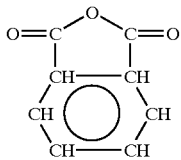

Phthalic anhydride

wherein R¹ is

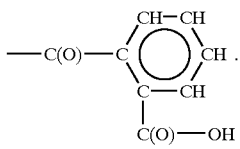

These polyoxyalkylene dicarboxylates are key materials to synthesis the carboxy complex.

Complex

The complex compound of the present invention conform to the following structure;

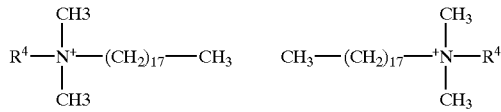

wherein;

R² is selected from the group consisting of;
—C(O)—CH₂—CH₂—C(O)—O⁻;
—C(O)—CH=CH—C(O)—O⁻; and

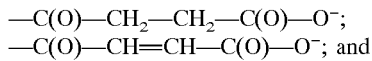

R⁴ is CH₃ or

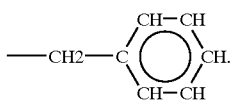

Preferred Embodiments

Polyoxyalkylene Dicarboxylates

In a preferred embodiment
R¹ is —C(O)—CH₂—CH₂—C(O)—OH;
In another preferred embodiment
R¹ is —C(O)—CH=CH—C(O)—OH;

In another preferred embodiment R¹ is

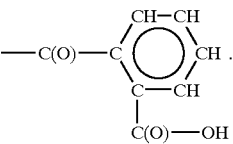

Complex

In a preferred embodiment
R² is —C(O)—CH₂—CH₂—C(O)—O⁻.
In a preferred embodiment
R² is —C(O)—CH=CH—C(O)—O⁻.
In a preferred embodiment R² is

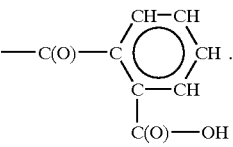

EXAMPLES

Raw Materials

Polyoxyalkylene Glycols

These compounds conform to the following structure

H—O—(CH₂CH₂—O)$_a$—(CH₂CH(CH₃)CH₂—O)$_b$—(CH₂CH₂—O)$_c$—H

| Example Number | a | b | c |
|---|---|---|---|
| 1 | 0 | 0 | 0 |
| 2 | 0 | 1 | 0 |
| 3 | 4 | 0 | 0 |
| 4 | 7 | 0 | 0 |
| 5 | 10 | 0 | 0 |
| 6 | 20 | 0 | 0 |

| Example Number | x | y | z |
|---|---|---|---|
| 7 | 4 | 7 | 10 |
| 8 | 7 | 4 | 20 |
| 9 | 10 | 20 | 4 |
| 10 | 20 | 10 | 7 |
| 11 | 20 | 20 | 20 |
| 12 | 7 | 7 | 7 |

These materials are items of commerce available commercially from Siltech Corporation Toronto Ontario Canada.

Preparation of Polyoxyalkylene Glycol Dicarboxylates

General Procedure

Polyoxyalkylene glycol dicarboxylates are prepared by the reaction of example 1–12 with two moles of anhydride. The reaction mass is heated to 80 to 100° C. and the theoretical amount of water is stripped off.

Succinic Anhydride Examples

To 206.0 grams of succinic anhydride is added to a clean glass vessel equipped with agitation and a thermometer.

Next, the specified amount of the specified allyl alkoxylate Examples 1–12 is added. The reaction mass is heated to 80 to 100 C. and the theoretical amount of water distills off. The allyl carboxylic ester is used without additional purification.

Examples 13–32

|  | Polyoxyalkylene Glycol | |
|---|---|---|
|  | Grams | Example Number |
| Example 13 | 58.0 | 1 |
| Example 14 | 102.0 | 2 |
| Example 15 | 234.0 | 3 |
| Example 16 | 366.0 | 4 |
| Example 17 | 498.0 | 5 |
| Example 18 | 938.0 | 6 |
| Example 19 | 1087.0 | 7 |
| Example 20 | 1718.0 | 8 |
| Example 21 | 1912.1 | 9 |
| Example 22 | 1836.2 | 10 |
| Example 23 | 2998.3 | 11 |
| Example 24 | 1087.0 | 12 |

Maleic Anhydride Examples

To 202.0 grams of maleic anhydride is added to a clean glass vessel equipped with agitation and a thermometer. Next, the specified amount of the specified intermediate Examples 1–12 is added. The reaction mass is heated to 80 to 100 C. and the theoretical amount of water distills off. The product is used without additional purification.

Examples 25–36

|  | Polyoxyalkylene Glycol | |
|---|---|---|
|  | Grams | Example Number |
| Example 25 | 58.0 | 1 |
| Example 26 | 102.0 | 2 |
| Example 27 | 234.0 | 3 |
| Example 28 | 366.0 | 4 |
| Example 29 | 498.0 | 5 |
| Example 30 | 938.0 | 6 |
| Example 31 | 1087.0 | 7 |
| Example 32 | 1718.0 | 8 |
| Example 33 | 1912.1 | 9 |
| Example 34 | 1836.2 | 10 |
| Example 35 | 2998.3 | 11 |
| Example 36 | 1087.0 | 12 |

Examples 37–48

Phthalic Anhydride Examples

To 146.0 grams of phthalic anhydride is added to a clean glass vessel equipped with agitation and a thermometer. Next, the specified amount of the specified intermediate Examples 1–12 is added. The reaction mass is heated to 80 to 100 C. and the theoretical amount of water distills off. The allyl carboxylic ester is used without additional purification.

|  | Polyoxyalkylene glycol | |
|---|---|---|
|  | Grams | Example Number |
| Example 37 | 58.0 | 1 |
| Example 38 | 102.0 | 2 |
| Example 39 | 234.0 | 3 |
| Example 40 | 366.0 | 4 |
| Example 41 | 498.0 | 5 |
| Example 42 | 938.0 | 6 |
| Example 43 | 1087.0 | 7 |
| Example 44 | 1718.0 | 8 |
| Example 45 | 1912.1 | 9 |
| Example 46 | 1836.2 | 10 |
| Example 47 | 2998.3 | 11 |
| Example 48 | 1087.0 | 12 |

Complexes

Cationic Component

Stearalkonium Chloride

Stearalkonium Chloride is an item of commerce available from a variety of sources. One such source is Henkel Corporation in Hoboken N.J.

Stearylalkonium chloride is also known as n,n-dimethyl, n-stearyl, n benzyl ammonium chloride and conforms to the following structure:

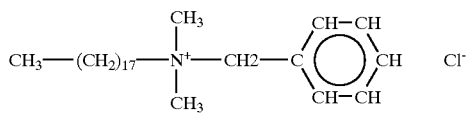

Stearyl Trimethyl Ammonium Chloride

Stearyl trimethyl ammonium chloride is an item of commerce available from a variety of sources. One such source is Henkel Corporation in Hoboken N.J.

Stearyl trimethyl ammonium chloride is also known as n,n,n-trimethyl,n-stearyl ammonium chloride and conforms to the following structure:

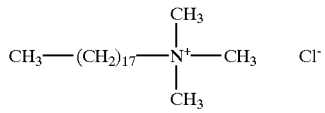

Preparation of Complex

Example 49

The complexes of the present invention (examples 49-) are typically prepared solutions ranging in concentrations of between 10 and 55% solids. The examples given use a 50% solid product.

To 410.0 grams of the 50% solution of polyoxyalkylene glycol dicarboxylate example 13 is added 500 grams of water. The resulting solution is heated to 80 C. In a separate container the quaternary compound is heated to 80 C. The molten quat is added to the hot polymer solution under good agitation. The pH is adjusted to 7.0 using NaOH 50%. The result is a clear homogeneous complex of quaternary and carboxy polymer.

Examples 50–82

Example 49 is repeated, only this time the specified number of grams of the specified example replaces the polyoxyalkylene glycol dicarboxylate used in example 49. 500 grams of water is added. The resulting solution is heated to 80 C. In a separate container the quaternary compound is heated to 80 C. The molten quat is added to the hot polymer solution under good agitation. The pH is adjusted to 7.0 using NaOH 50%. The result is a clear homogeneous complex of quaternary and carboxy polymer.

| | Carboxy Polymer | | Quaternary Compound | |
|---|---|---|---|---|
| Example | Grams | Example | type | Grams |
| 50 | 674.0 | 13 | stearalkonium chloride | 424.0 |
| 51 | 572.0 | 14 | stearalkonium chloride | 424.0 |
| 51 | 704.0 | 15 | stearalkonium chloride | 424.0 |
| 52 | 2082.0 | 16 | stearalkonium chloride | 424.0 |
| 53 | 1293.0 | 17 | stearalkonium chloride | 424.0 |
| 54 | 3642.0 | 18 | stearalkonium chloride | 424.0 |
| 55 | 2118.0 | 19 | stearalkonium chloride | 424.0 |
| 56 | 3878.0 | 20 | stearalkonium chloride | 424.0 |
| 57 | 6202.6 | 21 | stearalkonium chloride | 424.0 |
| 58 | 2380.0 | 22 | stearalkonium chloride | 424.0 |
| 59 | 318.0 | 23 | stearalkonium chloride | 424.0 |
| 60 | 406.0 | 24 | stearalkonium chloride | 424.0 |
| 61 | 670.0 | 25 | stearalkonium chloride | 424.0 |
| 62 | 934.0 | 26 | stearalkonium chloride | 424.0 |
| 63 | 1198.0 | 27 | stearalkonium chloride | 424.0 |
| 64 | 2978.0 | 28 | stearalkonium chloride | 424.0 |
| 65 | 2376.0 | 29 | stearyltrimethyl ammonium chloride | 348.0 |
| 66 | 1920.0 | 30 | stearyltrimethyl ammonium chloride | 348.0 |
| 67 | 4026.0 | 31 | stearyltrimethyl ammonium chloride | 348.0 |
| 68 | 3874.0 | 32 | stearyltrimethyl ammonium chloride | 348.0 |
| 69 | 6198.0 | 33 | stearyltrimethyl ammonium chloride | 348.0 |
| 70 | 2466.0 | 34 | stearyltrimethyl ammonium chloride | 348.0 |
| 71 | 408.0 | 35 | stearyltrimethyl ammonium chloride | 348.0 |
| 72 | 496.0 | 36 | stearyltrimethyl ammonium chloride | 348.0 |
| 73 | 760.0 | 37 | stearyltrimethyl ammonium chloride | 348.0 |
| 74 | 1024.0 | 38 | stearyltrimethyl ammonium chloride | 348.0 |
| 74 | 1288.0 | 39 | stearyltrimethyl ammonium chloride | 348.0 |
| 76 | 2168.0 | 40 | stearyltrimethyl ammonium chloride | 348.0 |
| 77 | 2466.0 | 41 | stearyltrimethyl ammonium chloride | 348.0 |
| 78 | 3728.0 | 42 | stearyltrimethyl ammonium chloride | 348.0 |
| 79 | 4116.0 | 43 | stearyltrimethyl ammonium chloride | 348.0 |
| 80 | 3965.0 | 44 | stearyltrimethyl ammonium chloride | 348.0 |
| 81 | 3144.3 | 45 | stearyltrimethyl ammonium chloride | 348.0 |
| 82 | 1233.0 | 46 | stearyltrimethyl ammonium chloride | 348.0 |

Applications Examples

The polymers of the present invention are very substantive conditioners to the hair and are surprisingly mild to the skin and eyes. Eye irritation is a major concern in the formulation of personal care products, particularly when working with quats. Primary eye irritation was tested using the protocol outlined in FHSLA 16 CFR 1500.42. The products were tested at 25% actives. The results were as follows:

| Compound | Score | Description |
|---|---|---|
| Stearyl trimethyl ammonium chloride | 106.0 | Severely Irritating |
| Example 65 | 9.3 | Minimally Irritating |
| Example 78 | 7.2 | Minimally Irritating |
| Stearalkonium Chloride | 116.5 | Severely Irritating |
| Example 50 | 11.8 | Minimally Irritating |
| Example 52 | 7.0 | Minimally Irritating |

As the data clearly shows, the irritation potential of the complex is dramatically reduced, when compared to the starting quat.

What is claimed is:

1. A complex conforming to the following structure;

$$R^2-O-(CH_2CH_2O)_a-CH_2CH(CH_3)O)_b-(CH_2CH_2O)_c-R^2$$

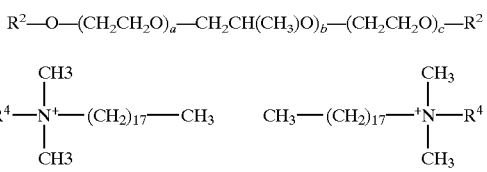

wherein;

$R^2$ is selected from the group consisting of;
—C(O)—CH$_2$—CH$_2$—C(O)—O$^-$;
—C(O)—CH=CH—C(O)—O$^-$; and

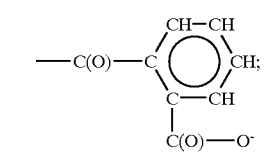

$R^4$ is $CH_3$ or
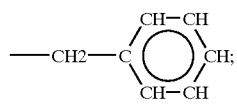
a, b and c are integers each independently ranging from 0 to 20.
2. A complex of claim 1 wherein
$R^2$ is —C(O)—CH$_2$—CH$_2$—C(O)—O$^-$.
3. A complex of claim 1 wherein
$R^2$ is —C(O)—CH=CH—C(O)—O$^-$.
4. A complex of claim 1 wherein
$R^2$ is
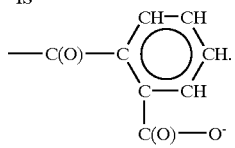
* * * * *

UNITED STATES PATENT AND TRADEMARK OFFICE
CERTIFICATE OF CORRECTION

PATENT NO. : 6,410,679 B1
DATED : June 25, 2002
INVENTOR(S) : O'Lenick, Anthony J. and Buffa, Charles W.

It is certified that error appears in the above-identified patent and that said Letters Patent is hereby corrected as shown below:

Column 8,
Lines 46-54, delete "$R^2$-O-($CH_2CH_2O$)$_a$-$CH_2$-$CH(CH_3)O$)$_b$—$CH_2CH_2O$)$_c$-$R^2$" and insert therefore -- $R^2$-O-($CH_2CH_2O$)$_a$-($CH_2$-$CH(CH_3)O$)$_b$—$CH_2CH_2O$)$_c$-$R^2$ --

Signed and Sealed this

Seventh Day of September, 2004

JON W. DUDAS
*Director of the United States Patent and Trademark Office*